(12) United States Patent
Venkateswaran et al.

(10) Patent No.: US 8,498,219 B2
(45) Date of Patent: Jul. 30, 2013

(54) MONITOR FOR MULTI-PROTOCOL LABEL SWITCHING (MPLS) NETWORKS

(75) Inventors: Rajesh Tarakkad Venkateswaran, Bangalore (IN); Avinash Jain, Bangalore (IN); Latha Vasudevarao, Bangalore (IN); Amit Goyal, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 12/893,940

(22) Filed: Sep. 29, 2010

(65) Prior Publication Data

US 2011/0019569 A1     Jan. 27, 2011

Related U.S. Application Data

(63) Continuation of application No. 11/744,837, filed on May 5, 2007, now Pat. No. 7,839,796.

(30) Foreign Application Priority Data

Mar. 14, 2007 (IN) .............................. 555/DEL/2007

(51) Int. Cl.
*G01R 31/08* (2006.01)

(52) U.S. Cl.
USPC ...................................... 370/252; 370/395.3

(58) Field of Classification Search
USPC .......... 709/224, 225, 232, 234–235; 370/252, 370/255, 241, 241.1, 242, 395.3
See application file for complete search history.

(56) References Cited

U.S. PATENT DOCUMENTS

2004/0205239 A1*  10/2004  Doshi et al. .................... 709/241
2006/0215577 A1*   9/2006  Guichard et al. ............. 370/254
2007/0237097 A1   10/2007  Maharana et al.

OTHER PUBLICATIONS

Cisco Systems, Inc. IP SLAs-LSP Health Monitor, /univercd/cc/td/doc/product/software/ios122sb/newft/122sbchmon.pdf, May 28, 2006, p. 80 pp, Publisher: Cisco Systems, Inc., Published in: San Jose CA, internet www.cisco.com.

* cited by examiner

*Primary Examiner* — Mark Rinehart
*Assistant Examiner* — Matthew Hopkins
(74) *Attorney, Agent, or Firm* — Hickman Palermo Truong Becker Bingham Wong LLP

(57) ABSTRACT

In one embodiment, a method includes receiving label data that indicates all interface labels that belong to each path ID of multiple path IDs associated with corresponding multiple paths between provider edge nodes in a Multi-Protocol Label Switching (MPLS) network. Each interface label is associated with a network interface on a node in the MPLS network. Based on the label data, an untested list that holds data that indicates all unique interface labels is generated. A tested interface selected from the untested list is scheduled for testing. After scheduling, the interface label of the tested interface is removed from the untested list. It is determined whether the untested list still includes data for at least one interface label. If not, then a test of the MPLS network is completed without testing every path end to end, thus conserving network resources.

26 Claims, 8 Drawing Sheets

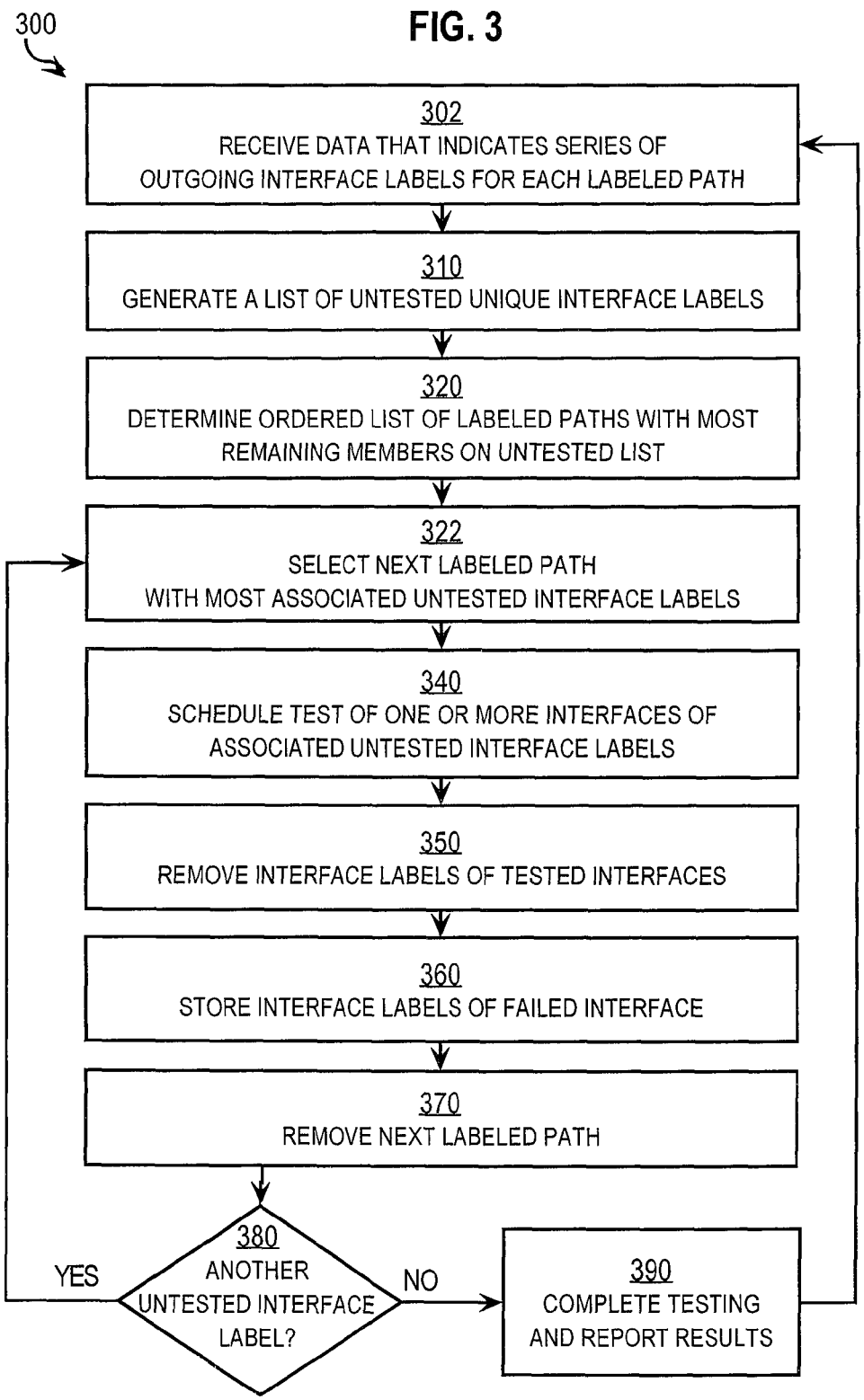

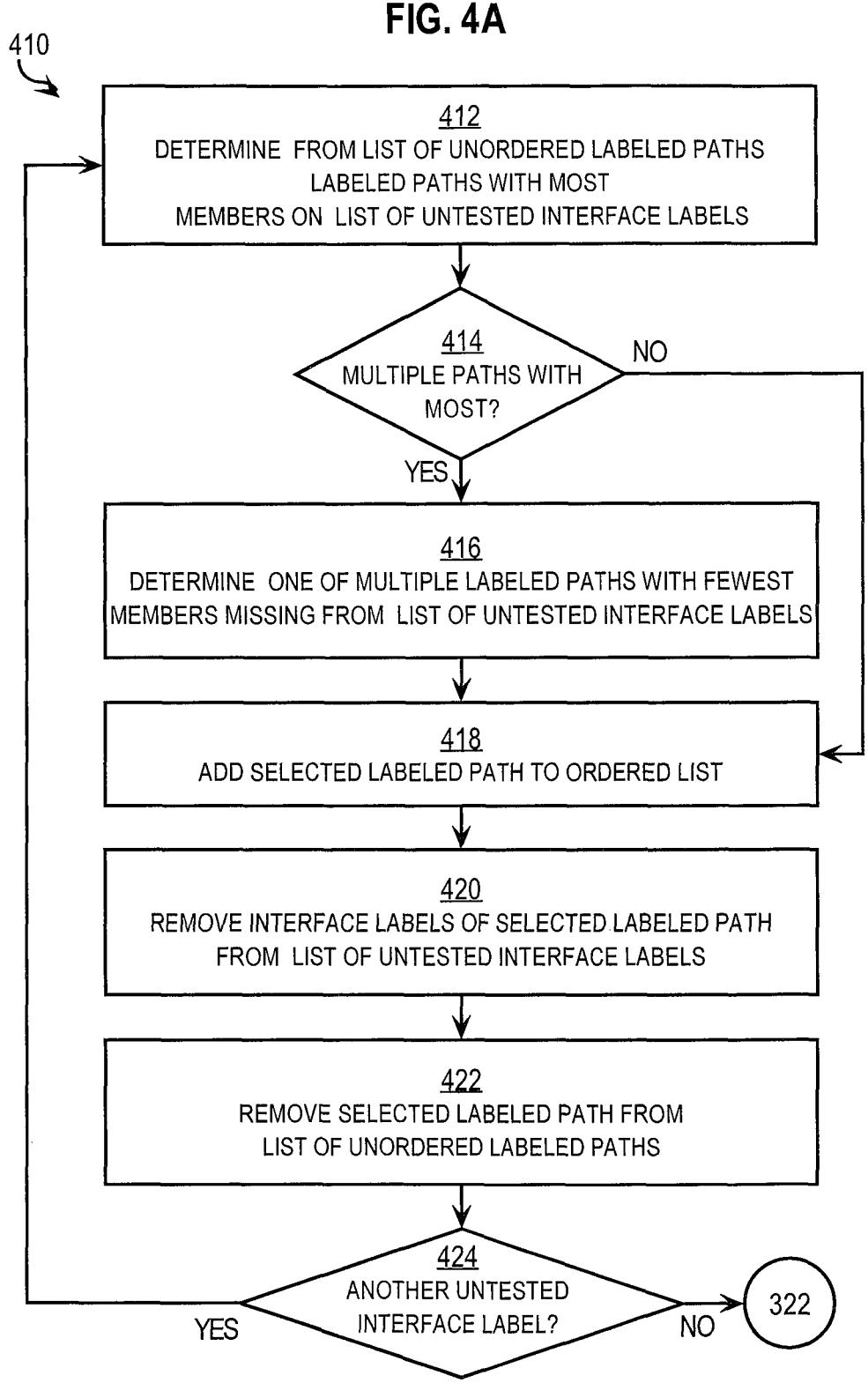

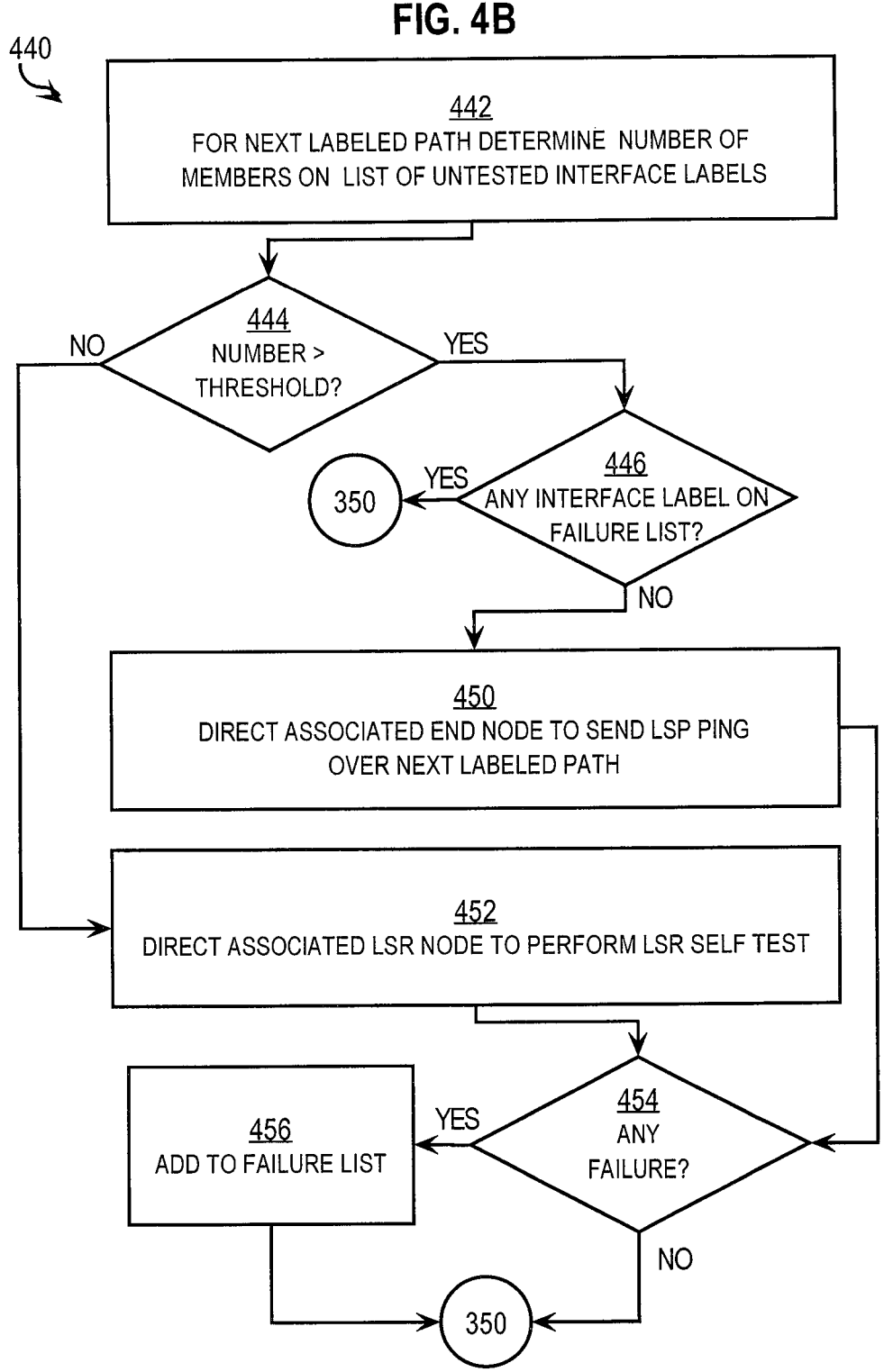

MONITOR FOR MULTI-PROTOCOL LABEL SWITCHING (MPLS) NETWORKS

CROSS-REFERENCE TO RELATED APPLICATIONS

This application claims benefit, under 35 U.S.C. §120, as a Continuation of U.S. patent application Ser. No. 11/744,837 entitled "Monitor for Multi-Protocol Label Switching (MPLS) Networks," by Rajesh Tarakkad Venkateswaran, Avinash Jain, Latha Vasudevarao, Amit Goyal, filed on May 5, 2007 now U.S. Pat. No. 7,839,796, which claims benefit of India National Appln. 555/DEL/2007, filed Mar. 14, 2007, under 35 U.S.C. §119(a). The entire contents of the above-referenced applications are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Field of the Invention

The present invention relates to Multi-Protocol Label Switching (MPLS) Networks; and in particular to monitors that detect actual performance of MPLS networks.

2. Description of the Related Art

Networks of general purpose computer systems and special purpose devices connected by external communication links are well known and widely used in commerce. The networks often include one or more network devices that facilitate the passage of information between the computer systems and special purpose devices.

The Multi-Protocol Label Switching (MPLS) protocol allows the creation of simple high-speed switches, circumventing the processing of more extensive header information in higher level protocols, such as the Internet Protocol (IP). MPLS also provides the ability to support multiple service models, do traffic management, and perform other networking functions, with a relatively simple header. MPLS works by appending an MPLS header containing one or more 'labels' called a label stack in front of headers of other higher layer protocols. MPLS is described at the time of this writing in Internet Engineering Task Force (IETF) request for comments (RFC) 3031 and RFC 3032 which can be found at the world wide web domain.ietforg in files named rfc3031.txt and rfc3032.tx in the file directory named rfc. The entire contents of rfc3031.txt and rfc3032.txt are hereby incorporated by reference as if fully set forth herein.

A service provider (SP) offers MPLS networks to support customers with multiple remote sites connected by networks of one or more SPs. The parameters of the service provided by a SP are spelled out in service level agreements (SLAs). SPs monitor the state of their MPLS networks to verify conformance with the SLAs. The traffic over the SP network used to monitor the state of the MPLS network is called operations, administration and maintenance (OAM) traffic. As the number of nodes in MPLS networks increase, the OAM traffic grows geometrically and has increased a burden on network resources.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates at a high level an example method for monitoring the MPLS network;
FIG. 4A illustrates an example method for one step of the method of FIG. 3;
FIG. 4B illustrates an example method for another step of the method of FIG. 3.

DESCRIPTION OF EXAMPLE EMBODIMENTS

Figure 1:
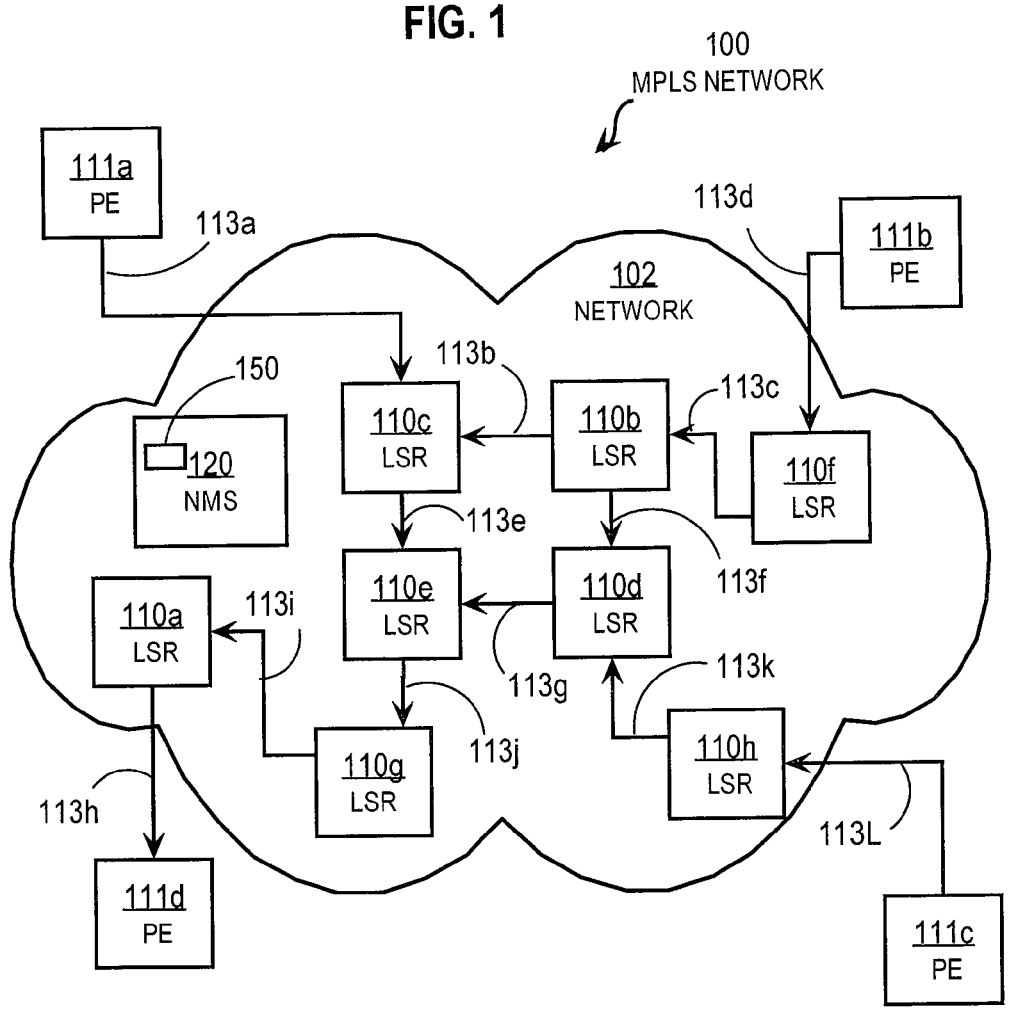
FIG. 1 illustrates an example Multi-Protocol Label Switching (MPLS) network.

A method and apparatus are described for monitoring an MPLS network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of the Internet Protocol (IP) as the layer 3 protocol encapsulated in an MPLS packet, but the invention is not limited to this context. In other embodiments, other protocols are encapsulated after the MPLS header, including the Asynchronous Transfer Mode (ATM) protocol, a Frame/Relay protocol, the Synchronous Optical Networking (SONET) protocol, and the Ethernet protocol.

1.0 Overview

In one set of embodiments, a method includes receiving label data that indicates all interface labels that belong to each path identifier (ID) of multiple path IDs that are associated with corresponding multiple paths between provider edge nodes in a Multi-Protocol Label Switching (MPLS) network. Each interface label is associated with a network interface on an intermediate network node in the MPLS network. Based on the label data, an untested list that holds data that indicates all unique interface labels in the MPLS network is generated. A tested interface that has an interface label that is included in the untested list is scheduled for testing. Data that indicates the interface label of the tested interface is removed from the untested list. It is determined whether the untested list includes data for at least one interface label. If not, then a test of the MPLS network is completed.

In other sets of embodiments, an apparatus or tangible medium is configured to cause one or more steps of the above method to be performed.

2.0 Network Overview

A network node is a network device or computer system or special device connected by communication links. An end node is a network node that is configured to originate or terminate communications over the network. An intermediate network node facilitates the passage of data between end nodes.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, typically higher layer of the OSI Reference Model. The header for a particular protocol typically indicates a type for the next protocol contained in its payload. The protocol in the payload is said to be encapsulated in the protocol of the header that precedes the payload. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. Some protocols span the layers of the OSI Reference Model. Some protocols follow a layer 2 protocol and precede a layer 3 protocol; and are said to be layer 2.5 protocols. For example, the Multi-Protocol Label Switching (MPLS) protocol is a layer 2.5 protocol.

Routers and switches are network devices that determine which communication link or links to employ to support the progress of packets through the network. Routers and switches can employ software executed by a general purpose processor, called a central processing unit (CPU), or can employ special purpose hardware, or can employ some combination to make these determinations and forward the packets from one communication link to another. Switches rely on information in layer two headers, routers rely on information in layer 3 headers, and label switched routers (LSR) relay on information in the MPLS header.

2.1 Example Network

FIG. 1 illustrates an example Multi-Protocol Label Switching (MPLS) network 100. The MPLS network 100 of a particular service provider includes, at the boundary of the service provider network, multiple provider edge (PE) nodes 111a, 111b, 111c and 111d (collectively referenced hereinafter as PE nodes 111). Each PE node 111 is connected to one or more customer premises nodes or nodes of one or more other service providers. The MPLS network 100 includes network 102 with multiple intermediate network nodes including label switching routers (LSR) 110a, 110b, 110c, 110d, 110e, 110f, 110g, 110h (collectively referenced hereinafter as LSR 110). The MPLS network 100 also includes a network management system 120 on one or more nodes, which is used to establish and monitor labeled paths through the MPLS network. In an illustrated embodiment, a modified monitor process 150 operates on NMS 120 to monitor the paths in MPLS network 100 more efficiently, using substantially fewer network resources to check the MPLS paths, than a current approach to monitoring an MPLS network 100.

Although four PEs 111, eight LSRs 110 and one NMS 120 are depicted in FIG. 1 for purposes of illustration, in various other embodiments more or fewer LSRs are connected to each other and to more or fewer or the same number of PE nodes or one or more network management systems.

Each of the LSR 110 is connected by one or more communication links with one or more other LSR 110 or PE node 111. Each communication link connects an inbound network interface and an outbound network interface on one node with an inbound interface and an outbound network interface on another node. Because each outbound interface is given a different label in MPLS, as described in more detail below, the direction of communication over a communication link from only one outbound network interface is depicted in FIG. 1. Each communication link also supports communication in the opposite direction (not shown) from an outbound interface on the opposite node.

An MPLS network includes one or more paths connecting two or more PE nodes through an underlying network using one or more LSR. Each path is identified at one PE node by a label associated with a destination PE node. Any method may be used to identify uniquely the destination PE node. For purposes of illustration, it is assumed that the destination PE node is uniquely identified by its IP address. In the following, for purposes of illustration, the MPLS label used at one PE to indicate a path to a destination PE is signified by the letters modifying the call out numbers for the two PEs. Thus the MPLS label at PE 111a for the path to PE 111b is signified by AB.

A MPLS path is implemented by label based routing tables at each LSR 110 between the PE nodes 111. An MPLS packet with a particular label arrives at an inbound network interface on an LSR 110. The LSR employs a look up a table that associates the particular label with a second label that is associated with a particular outbound network interface. For purposes of illustration, it is assumed that the outbound network interface is identified uniquely by its own IP address or a relative address at the IP address of the loop back interface that identifies the node itself. The MPLS packet is sent out over the outbound network interface with the second label. Thus routing is performed without regard to the layer 3 header encapsulated in the MPLS packet, such as the IP addresses in an IP header. Similarly, at the next LSR, a look up table associates the second label on an inbound network interface with a third label that is associated with one of the next LSR outbound network interfaces.

Figure 2:
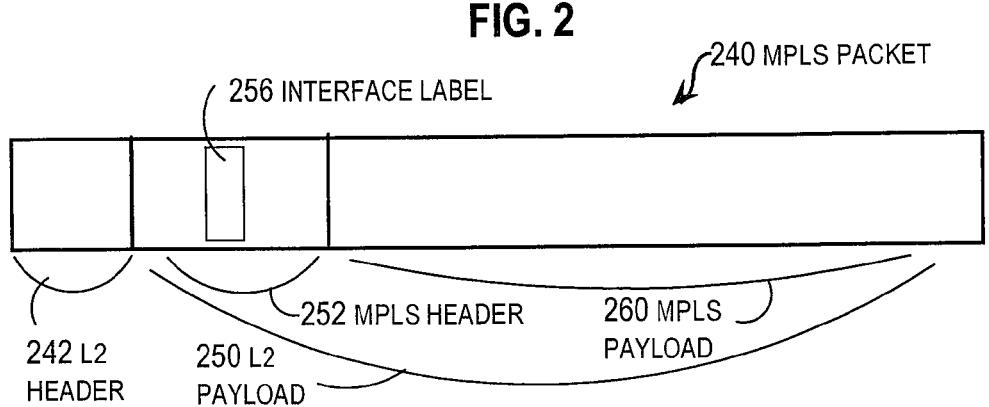
FIG. 2 illustrates an example MPLS packet.

FIG. 2 illustrates an example MPLS packet 240. The MPLS packet 240 includes a layer 2 (L2) header 242 and a L2 payload 250. The L2 payload 250 includes an MPLS header 252 and a MPLS payload 260. The MPLS header 252 includes an interface label field 256 that holds data that indicates the label of the outbound network interface through which the packet 240 is sent over a communication link. In a data plane packet, the MPLS payload 260 includes data for a different protocol, such as an IP header and payload. The test packets are MPLS packets 240 in which the MPLS payload 260 includes data that indicates the type of test and therefore the method to be executed at a PE node 111 or LSR 110.

2.2 Example Monitoring

In a present approach, called the brute force approach, the MPLS network is tested by sending MPLS test messages across every path in an MPLS network. For example, test messages are sent over paths AB, AC, AD, BC, BD, CD and the return paths BA, CA, DA, CB, DB, and DC. In a well known approach implemented in the Internet Operating System (IOS) of CISCO SYSTEMS, INC.™ of San Jose Calif., the NMS 120 causes the tests to be performed by sending messages to a process called an LSP Health Monitor on each PE 111 to send a MPLS test for each path LSP on the PE 111. The LSP Health Monitor is described in "IP SLAs—LSP Health Monitor," published by Cisco Systems Inc., San Jose, Calif., May 29, 2006, 80 pp, the entire contents of which are hereby incorporated by reference as if fully set forth herein. This document can be found in file sbchmon.pdf found in directory/univercd/cc/td/doc/product/software/ios122sb/ newft/122sbc27/at the World Wide Web domain cisco.com. For example, in MPLS network 100, PE 111*a* is configured to receive an IOS message from NMS 120 and in response to send an LSP test message over three paths with path identifiers (IDs) AB, AC, AD at regular intervals of time. Similarly, PE 111*b* is configured to send an LSP test message over the paths with IDs BA, BC, BD., PE 111*c* is configured to send an LSP test message over the paths with IDs CA, CB, CD, and PE 111*d* is configured to send an LSP test message over the paths with IDs DA, DB, DC, each at regular intervals of time. Any errors detected are reported back to NMS 120.

Several MPLS control packets have been adopted for the MPLS standard and are used in testing MPLS networks. A labeled switched path (LSP) ping provides an end to end test and returns an error message if the ping is not properly extracted at the destination PE for the path. An LSP trace route message that encounters a network interface that is unable to forward the message causes an LSR to report the problematic outbound interface to the node that initiated the LSP trace back. The LSP ping and LSP trace back are described in RFC 4379, available at the ieft.org domain in file rfc4379.txt, the entire contents of which are hereby incorporated by reference as if fully set forth herein. An LSR self test is a message directed to a particular LSR. The receiving LSR requests neighboring nodes to send an MPLS packet with the expected incoming label on the corresponding inbound network interfaces and determines whether each is routed using the lookup table to an outgoing interface associated with an outgoing label. Neighbors receiving the test packets do not forward them, but send confirmation messages back that the forwarded packets were received. If any incoming or outgoing interface does not receive the expected message, then the error is reported to the node that sent the self test message. At the time of this writing, the LSR self test is described in draft-ietf-mpls-lsr-self-test-06, the entire contents of which are hereby incorporated by reference as if fully set forth herein. Draft-ietf-mpls-lsr-self-test-06 can be found in file draft-ietf-mpls-lsr-self-test-06.txt in directory/internet-drafts/at World Wide Web domain ietforg.

For purposes of illustration, it is assumed that the MPLS interface label used for an outbound interface is signified by the letter modifying the call out number for the direction depicted in FIG. 1. Thus the MPLS path AD is implemented by look up tables at nodes 111*a*, 110*c*, 110*e*, 110*g*, 110*a* that indicate interface labels signified by the letters A, E, J, I, H associated with outbound network interfaces 113*a*, 113*e*, 113*j*, 113*i*, 113*h*, respectively. The MPLS packet that leaves PE 111*a* has data in field 256 that indicates interface label A. At LSR 110*c* the data packet received with label A is associated with outbound interface 113*e* and label E. The MPLS packet that leaves LSR 110*c* has data in field 256 that indicates interface label E; and the process is repeated at subsequent LSR. It is noted that the same outbound interface may have different labels for different LSP paths. For example, the path BD uses outbound interface 113*b* with a label B for paths directed to PE 111D as described above, but uses a different label (not specified herein) for MPLS packets on path BA directed to PE 111*a*. To avoid confusion, only the three MPLS paths AD, BD, CD are considered when interface labels that match call out letters are used.

Table 1 shows paths and corresponding sequences of interface labels that implement the paths in MPLS for the three MPLS paths to PE 111*d*. To avoid obscuring the operation of the illustrated embodiment, the other nine labeled paths in MPLS network 100 (e.g., AB, AC, BC and the return paths) are not described further. This is equivalent to defining an MPLS network with only three one way paths from PE nodes 111*a*, 111*b*, 111*c* to PE node 111*d*. It is noted that according to Table 1, none of these three paths use outbound network interface 113*f* (e.g., there is no interface label F).

TABLE 1

Example Path Label Data

| Path Label | Interface label sequence |
|---|---|
| AD | A, E, J, I, H |
| BD | D, C, B, E, J, I, H |
| CD | L, K, G, J, I, H |

With the brute force monitoring method, these three paths are tested with three LSP pings over labeled paths AD, BD, CD. Note that these three LSP pings send OAM traffic over network interface 113*e* with label E two times and over network interfaces 113*h*, 113*i*, 113*j* with interface labels H, I, and J, respectively, three times each. This amounts to seven excess OAM messages that are not necessary to test the performance of MPLS network 100, which has only four PE 111 and eight LSR 110. When the size of the MPLS network increases, the excess OAM traffic represented by the brute force approach becomes substantial. It can be surmised that, in an MPLS with hundreds of PEs and hundreds of LSRs, tens of thousands of excess OAM messages are sent. Since NMS monitors cause all paths to be tested several times a minute, substantial network resources, including both bandwidth on the communication links and processing unit time at the network nodes, are consumed in handling excess OAM messages. Saving a significant portion of these excess OAM messages would amount to substantial conservation of network resources.

3.0 Method at Network Management System

According to the illustrated embodiment, excess tests of outbound network interfaces are reduced substantially. A test that does not give new information about label switching at a node is not performed.

FIG. 3 illustrates at a high level an example method for monitoring the MPLS network. Although steps are depicted in FIG. 3, and in subsequent flow diagrams FIG. 4A and FIG. 4B, in a particular order for purposes of illustration, in other embodiments, one or more steps are performed in a different order or overlapping in time, in one or more serial or parallel processes, or one or more steps are omitted, or the method is changed in some combination of ways. In an illustrated embodiment, method 300 is performed by modified monitor process 150 on NMS 120. In other embodiments method 300 is performed by one or more processes on one or more NMS 120 or one or more nodes of network 102, including one or more PE nodes 111 or one or more LSR 110, or some combination.

In step 302, data is received that indicates a series of outgoing interface labels for each labeled path (e.g., each LSP).

Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited. In an illustrated embodiment, the data is received at NMS 120 based on issuing LSP trace back messages for all paths at least once and then receiving MPLS update advertisements from one or more nodes between such comprehensive trace back tests. Such data is routinely collected by several commercial NMS programs, including IOS NMS from CISCO SYSTEMS, INC.™ of San Jose Calif. In some embodiments, the label data listed in Table 1 is received. In an example, embodiment, the label data includes the node identifier (e.g., the node's loop back IP address) and the outbound network interface identifier (e.g., the network interface IP address). It is assumed for purposes of illustration that, during step 302, the data listed in Table 2 is received.

TABLE 2

Example label data received at network management system.

| LSP ID (destination node) | node | Outbound interface label | Outbound network interface |
|---|---|---|---|
| AD (PE node 111d) | PE node 111a | A | 113a |
| " | LSR 110c | E | 113e |
| " | LSR 110e | J | 113j |
| " | LSR 110g | I | 113i |
| " | LSR 110a | H | 113h |
| " | PE node 111d | — | — |
| BD (PE node 111d) | PE node 111b | D | 113d |
| " | LSR 110f | C | 113c |
| " | LSR 110b | B | 113b |
| " | LSR 110c | E | 113e |
| " | LSR 110e | J | 113j |
| " | LSR 110g | I | 113i |
| " | LSR 110a | H | 113h |
| " | PE node 111d | — | — |
| CD (PE node 111d) | PE node 111c | L | 113L |
| " | LSR 110h | K | 113k |
| " | LSR 110d | G | 113g |
| " | LSR 110e | J | 113j |
| " | LSR 110g | I | 113i |
| " | LSR 110a | H | 113h |
| " | PE node 111d | — | — |

In step 310, a list of untested unique interface labels is generated. No interface label appears on this list more than once; and every interface label used by the MPLS network appears. In the illustrated embodiment, the list includes the associated node identifier and the outbound network interface identifier received during step 302. In some embodiments the list does not include the associated node identifier or the associated outbound network interface or either. For the 3 path MPLS indicated in Table 2, the list of untested interface labels generated during step 310 is given in Table 3.

TABLE 3

Example list of untested interface labels initially generated

| Interface label | node identifier | outbound network interface |
|---|---|---|
| A | IP address for PE node 111a | IP address for 113a |
| B | IP address for LSR 110b | IP address for 113b |
| C | IP address for LSR 110f | IP address for 113c |
| D | IP address for PE node 111b | IP address for 113d |
| E | IP address for LSR 110c | IP address for 113e |
| G | IP address for LSR 110d | IP address for 113g |
| H | IP address for LSR 110a | IP address for 113h |
| I | IP address for LSR 110g | IP address for 113i |
| J | IP address for LSR 110e | IP address for 113j |
| K | IP address for LSR 110h | IP address for 113k |
| L | IP address for PE node 111c | IP address for 113L |

In step 320 an ordered list of labeled paths with the most remaining members on the untested list is determined. This step is performed in order to test the most labeled outbound interfaces with the fewest OAM messages, such as the fewest LSP pings. The first LSP in the list includes the most members of the untested list. If more than one LSP tie for the most members on the untested list, one is chose by any tie breaking procedure. For example, in some embodiments the LSP with the first label in alphanumeric order is selected or the LSP with a source or destination node that is lower than those of any other LSP is selected. The members of the list that belong to the first LSP are then considered tested and removed from the untested list. In some embodiments, the interface labels considered tested are physically removed from a data structure; and in some embodiments the data structure entries are simply marked as tested. The next LSP in the ordered list includes the most members remaining on the untested list. If more than one LSP ties for the most members remaining on the untested list, one is chose by any tie breaking procedure. In some embodiments, the tie breaking procedure is to select the LSP that has the fewest members missing from the LSP list. An advantage of this tie breaking procedure is that a LSP ping sent over such an LSP will retest fewer outbound interface labels that are considered already tested.

FIG. 4A illustrates an example method 410 for this step 320 of the method 300 of FIG. 1. In step 412, one or more LSPs that include the most members remaining on the untested list are determined. The first time step 412 is executed, all interface labels in the MPLS are in the untested list; thus the longest LSP, i.e., the LSP with the most outbound interface labels in the label data is selected as the first LSP in the ordered list. In the example of Table 2, AD has 5 outbound interface labels, BD has 7 and CD has 6. Thus LSP ID BD is the first on the ordered list. In some embodiments, the ordered list includes data that indicates the members of the untested list that become tested by virtue of an LSP ping or the number of such members or both.

In step 414, it is determined whether there are multiple LSPs tied for the most members currently on the untested list. If not, then control passes to step 418. If so, then control passes to step 416. For example, if another LSP also includes 7 members remaining on the untested list, control passes to step 416. In step 416, one of the LSPs tied for including the most members from the untested list is selected. The selected LSP includes the fewest interface labels that are missing from the untested list. If multiple LSPs are still tied, one of the LSPs is selected by any other tie breaking procedure. For example, the first time step 412 is executed no tied LSP will include any interface labels that are missing from the untested list; so another tie breaking procedure is used, such as first label or smallest IP address. After step 416, control passes to step 418.

In step 418, the selected LSP is added in the next position of the ordered list of LSPs. In some embodiments, step 418 includes listing the members on the untested list that belong to the selected LSP. In some embodiments, step 418 includes storing the number of members on the untested list that belong to the selected LSP. In some embodiments, both are included in the ordered LSP list. For example, in some embodiments, labels B, C, D, E, H, I, J are added to the ordered list.

In step 420, the interface labels that belong to the selected LSP are considered tested and are removed from the untested list. For example, entries for labels B, C, D, E, H, I, J are deleted from the untested list or marked as tested. The revised untested list is shown in Table 4.

TABLE 4

Example list of untested interface labels after selecting LSP BD.

| Interface label | node identifier | outbound network interface |
|---|---|---|
| A | IP address for PE node 111a | IP address for 113a |
| G | IP address for LSR 110d | IP address for 113g |
| K | IP address for LSR 110h | IP address for 113k |
| L | IP address for PE node 111c | IP address for 113L |

In step 422, the selected labeled path is removed from further consideration. Any method may be used to remove the selected LSP. For example, the LSP is marked as ordered in the label data depicted in Table 2, in some embodiments. In other embodiments, the entries for the selected LSP, e.g., LSP BD, are deleted from the label data, e.g., are deleted from Table 2. In the example of Table 4, LSP BD is removed from further consideration. Control then passes to step 424.

In step 424, it is determined whether any members remain in the untested list. If so, control passes back to step 412 to determine the next LSP IDID that has the most members that remain in the untested list. For example, it is then determined in step 412 which LSP has the most members listed in Table 4. In the example of Table 4, AD has 1 outbound interface labels, and CD has 3. Thus LSP IDLSP ID CD is the next on the ordered list.

If it is determined that no members remain in the untested list, then the ordered list is complete and control passes to step 322, shown in FIG. 3. Table 5 shows the LSP ordered list for the illustrated example, when there are no more members in the untested list and control passes to step 322.

TABLE 5

Example ordered list of LSP IDLSP IDs.

| LSP IDLSP ID | Number of untested list | Members of untested list |
|---|---|---|
| BD | 7 | B, C, D, E, H, I, J |
| CD | 3 | G, K, L |
| AD | 1 | A |

In step 322, the next LSP in the ordered list is selected to begin testing. The first time step 322 is executed the first LSP in the ordered list is selected. For example, LSP BD is selected in step 322.

In some embodiments, including the illustrated embodiment, the LSP tests are scheduled for all LSP paths to be tested, before any test results are obtained. In these embodiments, the ordered list is determined in step 320 once for all interface labels and then used to set up a schedule at each PE node 111, for example using the LSP Health Monitor scheduler available in IOS. In these embodiments, step 322 includes selecting the next LSP in the ordered list.

In some embodiments, the next LSP to be tested is determined after the results from the previous test are obtained, as described in more detail below. In some of these embodiments, the entire ordered list (e.g., shown in Table 5) is not determined in step 320 once and then used to set up a schedule at each PE node 111. Instead, step 320 is omitted and it is determined in step 322 which is the next LSP only; and subsequent LSPs are not determined, until control passes back to step 322. The next LSP is determined using one or more steps of method 410, described above, without looping over all remaining LSPs.

In step 340 one or more tests are scheduled for one or more interface labels not yet tested. In some embodiments, step 340 includes sending an LSP ping or LSR self test message. In some embodiments, step 340 merely includes sending a scheduled test to a LSP Health Monitor or other process on a PE or LSR, which then issues the appropriate message or messages. The use of LSP pings and LSR self tests during step 340 is described in more detail below, with reference to FIG. 4B.

In some embodiments, untested interface labels are tested in order of their appearance in the untested list, regardless of their use within an LSP. In these embodiments, steps 320 and 322 are both omitted.

FIG. 4B illustrates an example method 440 for step 340 of the method 300 of FIG. 3. In step 442, the number of members of the untested list that belong to the current LSP is determined. For example, the number of members of the untested list that belong to LSP BD is 7, the number that belong to CD is three and the number that belong to AD is one. This number can be determined in any method. In the illustrated embodiment, the number is included as details with the LSP ID in the ordered list of LSP IDs, e.g., as depicted in Table 5. In some embodiments, the number is obtained by counting the interface labels listed with each LSP ID in the ordered list. In some embodiments that get test results before testing the next LSP, the number has just been determined to determine the next LSP and need not be retrieved from a data structure in memory or storage.

In step 444 it is determined whether the number of members of the untested list is greater than a threshold number. If so, then an LSP ping is preferably used in embodiments that test interface labels within LSP IDs. If not, then an LSR self test is used. The threshold can be determined by experimentation to determine what value gives the best reduction in excess OAM traffic during MPLS monitoring. In the illustrated embodiment, the threshold is one (1).

If it is determined in step 444 that the number of members of the untested list that belong to the current LSP ID is greater than the threshold, then control passes to step 446. In step 446 it is determined whether any members of the untested list for the current LSP ID are also on a failed list of interface labels that failed a previous test. If so, then control passes to step 350 to skip the current test, e.g., to skip sending an LSP ping over the LSP with the current label. In embodiments, including the illustrated embodiment, in which all tests are scheduled before any test results are obtained, step 4468 is omitted from step 340.

If it is determined, in step 446, that no member of the untested list for the current LSP ID is also on the failed list, or if step 446 is omitted, then control passes to step 450. In step 450, the source PE node 111 for the current LSP ID is directed to send an LSP ping over that LSP. In some embodiments, the LSP ping is scheduled for delayed execution, e.g., is merely sent to an LSP Health Monitor to perform the LSP ping in the prescribed order. In some embodiments, the PE node 111 is directed to send the LSP ping immediately. Control then passes to step 454.

For example, in the illustrated embodiment with the ordered list of Table 5, when the next LSP ID is the first one, BD, the number of members of the untested list is 7 and is thus greater than the threshold of 1. Step 446 is omitted and control passes directly to step 450. In step 450 an LSP ping over BD is scheduled by inserting the LSP ping over BD in the LSP Health Monitor at PE 111b.

If it is determined in step 444 that the number of members of the untested list that belong to the current LSP ID is not greater than the threshold, then control passes to step 452. In step 452, the members of the untested list are tested using the LSR self test. Control then passes to step 454.

For example, in the illustrated embodiment with the ordered list of Table 5, when the next LSP ID is the third one, AD, the number of members of the untested list is 1 and is thus not greater than the threshold of 1. Control passes to step 452. In step 452 untested outbound interface label A is tested by directing PE 111a to perform an LSR self test. The modified monitor process 150 on NMS 120 is scheduled to send, or sends immediately, a LSR self test message to PE 111a for immediate or delayed and repeated execution at regular intervals.

In step 454 it is determined whether there is a failure. If so, control passes to step 456. In step 456, the outbound interface label that is associated with the failure is added to the failure list. In some embodiments, step 456 includes removing from scheduled testing any test for an LSP ping over an LSP that includes the failed interface label. For example, if during the LSP ping sent over LSP with label BD, packets are not forwarded over interface label J on interface 113j on node 110e, then this information is sent to the NMS 120. The process 150 on NMS 120 determines that the same interface label on the same node belongs to LSP with label CD. Thus an LSP ping over LSP CD will also fail. The scheduled LSP ping from PE node 111c over LSP CD is removed from the schedule at LSP Health Monitor on PE 111c. The removal is performed because the LSP ping over CD is guaranteed to fail, at least at interface label J on node 110e, if not before. The OAM messages generated by the LSP ping over CD are wasteful of network resources. The LSR self test at node 111a for interface label A is not removed, because this test does not involve the failed interface label J.

In some embodiments, step 456 includes sending LSR self test messages to nodes downstream of the failure. Such tests are useful to test the interface labels that would have been tested by some LSP pings that were not scheduled because they were deemed redundant with tests scheduled ahead of them. For example, if a PE node x (not shown) linked to LSR 110g had a LSP XD to PE node 111d, that LSP would not have been checked with an LSP ping but instead with an LSR self test at PE x. The logic of the ordered list would assume that tests of interface labels I and H had been performed by LSP ping over BD. When that LSP ping failed, the assumption was violated. This situation is also naturally corrected in embodiments in which the next LSP is determined after the test of the previous LSP is performed.

In embodiments, including the illustrated embodiment, in which all tests are scheduled before any test results are obtained, step 454 and 456 are omitted from step 340. In some of these embodiments, steps 454 and 456 are performed during step 390. In some embodiments, steps 454 and 456 are performed during step 360.

If it is determined, in step 454, that there is not a failure, then testing of the next LSP on the ordered list or a next untested interface label, if any, is performed by passing control to step 350, depicted in FIG. 3.

In step 350, interface labels of tested interfaces are removed from the untested list, or marked as tested. For example, all interface labels of an LSP that is tested with an LSP ping and still on the untested list are removed from the untested list. In embodiments, including the illustrated embodiment, in which all tests are scheduled before any test results are obtained, step 350 is redundant with steps performed during step 322 and step 350 is omitted. In these embodiments, the ordered list already accounts for the interface labels scheduled to be tested.

In step 360, interface labels of failed interfaces are added to the failed list. In embodiments, including the illustrated embodiment, in which all tests are scheduled before any test results are obtained, step 360 is omitted. In these embodiments, the failures are detected during step 390.

In step 370, the next path is removed from the LSP paths considered for testing. In embodiments in which the outbound interface labels are tested regardless of LSP ID, step 370 is omitted. In embodiments, including the illustrated embodiment, in which an ordered list is determined in step 320, step 370 is equivalent to removing the current LSP ID from the ordered list or removing it from further consideration. In embodiments in which step 320 is omitted, step 370 is equivalent to removing the next LSP ID from the label data received in step 302 from further consideration.

In step 380, it is determined whether another interface label remains on the untested list. In embodiments, including the illustrated embodiment, in which all tests are scheduled based on the ordered LSP ID list, step 380 is equivalent to determining whether an entry remains on the ordered LSP ID list. In these embodiments, the ordered list already accounts for the interface labels that still need to be scheduled for testing. If it is determined in step 380 that there is another member still on the untested list, control passes to step 322 to select the next LSP ID with the most members in the untested list.

If it is determined, in step 380, that no interface label remains on the untested list, control passes to step 390. In step 390 the testing of outbound interface labels is completed and results are reported. For example, a report is generated that all MPLS paths are working properly. In embodiments, including the illustrated embodiment, in which all tests are scheduled before any test results are obtained, step 390 includes causing the PE nodes 111 to send the scheduled LSP pings from the PE nodes 111, and sending the scheduled LSR self test messages, at the scheduled intervals of time. In various such embodiments that also do not issue tests known to fail, step 390 includes step 456 to report failures to NMS 120 and have process 150 either add the failure to a failure list or send a message to one or more PE 111 to remove a scheduled LSP ping, such as removing a LSP ping from the LSP Health Monitor on the affected PE 111.

Control then passes back to step 302 to receive updates on the LSP IDs and interface labels in the MPLS network.

Figure 5:
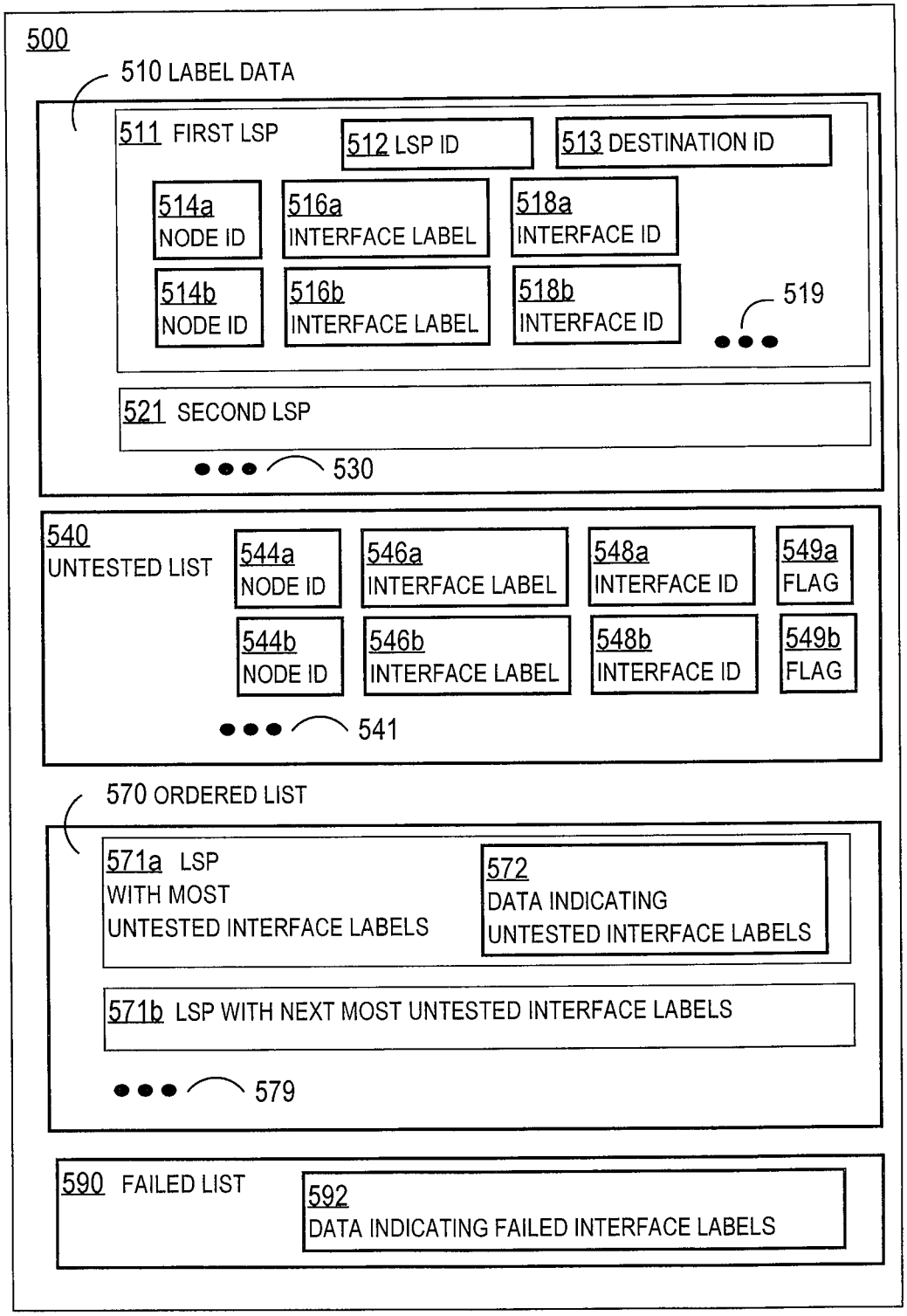
FIG. 5 illustrates example data structures included in an example modified monitor process.

FIG. 5 illustrates example data structures included in an example modified monitor process 500. In the illustrated embodiment, the process 500 maintains four data structures: a label data data structure 510, an untested list data structure 540, an ordered list data structure 570, and a failed list data structure 590. In other embodiments one or more data structures are omitted.

The label data data structure 510 includes a list for multiple LSP in the MPLS network, including a first LSP list 511, a second LSP list 521 and other LSP lists indicated by ellipsis 530. Each LSP list includes an LSP ID field (e.g., LSP ID field 512 for the First LSP), a destination node ID field (e.g., destination node ID field 513 for the First LSP) and multiple sets of fields that describe the interface labels used to switch data packets of the subject LSP. In the illustrated embodiment, the set of fields includes a node ID field for an node that switches traffic for the LSP (e.g., node ID field 514a and node ID field 514b, and others indicated by ellipsis 519 for the first LSP list 511), collectively referenced hereinafter as node ID field 514. The node ID field 514 holds data that indicates the node, e.g., a loop back IP address for the node. The set of fields also includes an interface label field for the node (e.g., interface label field 516a and interface label field 516b, and others indicated by ellipsis 519 for the first LSP list 511), collectively referenced hereinafter as interface label field 516. The interface label field 516 holds data that indicates the local MPLS interface label for the outbound interface. The set of fields also includes an interface ID field for the outbound interface on the node (e.g., interface ID field 518a and interface ID field 518b, and others indicated by ellipsis 519 for the first LSP list 511), collectively referenced hereinafter as interface ID field 518. The interface ID field 518 holds data that indicates the local outbound interface, e.g., the interface IP address. In some embodiments that use a network unique IP address for the interface ID, a separate node ID field 514 may be omitted. Example data for the label data data structure 510 is given above in Table 2.

The untested list data structure 540 holds data for each unique interface label in the MPLS network, regardless of the LSP that utilizes it. The untested list data structure 540 includes a node ID field for a node that switches traffic for the MPLS (e.g., node ID field 544a and node ID field 544b, and others indicated by ellipsis 541, collectively referenced hereinafter as node ID field 544). The node ID field 544 holds data that indicates the node that does the switching, as in field 514 described above, e.g., a loop back IP address for the node. The untested list data structure 540 also includes an interface label field for that node (e.g., interface label field 546a and interface label field 546b, and others indicated by ellipsis 541, collectively referenced hereinafter as interface label field 546). The interface label field 546 holds data that indicates the local MPLS interface label for the outbound interface as in field 516. The untested list data structure 540 also includes an interface ID field for the outbound interface on the node (e.g., interface ID field 548a and interface ID field 548b, and others indicated by ellipsis 541, collectively referenced hereinafter as interface ID field 548). The interface ID field 548 holds data that indicates the local outbound interface as in field 518, e.g., the interface IP address. In some embodiments that use a network unique IP address for the interface ID, a separate node ID field 544 may be omitted. Example data for the untested list data structure 540 is given above in Table 3 and in Table 4. In some embodiments in which the interface label is marked as tested rather than removed from the untested list data structure 540, the untested list data structure 540 also includes a flag field (e.g., flag field 549a and flag field 549b, and others indicated by ellipsis 541, collectively referenced hereinafter as flag field 549). The flag field 549 holds data that indicates whether the interface label is considered tested or considered still untested.

The ordered list data structure 570 holds data for each LSP in the MPLS network in the order the LSP is to be tested. 570 includes a record for multiple LSP in the MPLS network, including a record 571a for the LSP with the most untested interface labels, a record 571b and other records indicated by ellipsis 579, collectively referenced hereinafter as ordered list records 571. Each record 571 includes data that indicates an LSP (e.g., an LSP ID field or a pointer to a list in the label data data structure 510), and a data field 572 that holds data that indicates the untested interface labels that belong to the subject LSP. In some embodiments, the data field 572 includes a node ID field an interface label field and an interface ID field as described above for label data data structure 510 for every untested interface label. In some embodiments, the interface label is indicated in field 572 by a pointer to a set of fields in the corresponding LSP list in data structure 510 or in untested list data structure 540 in which the flag field 549 is included. In some embodiments the data field 572 includes a number field that indicates how many untested interface labels belong to the subject LSP. Example data for the ordered list data structure 570 is given above in Table 5. In some embodiments in which tests are performed as soon as the next LSP is selected, an ordered list data structure 570 is omitted.

The failed list data structure 590 holds data for each unique interface label that was found to fail as a result of an executed test, regardless of the LSP that utilizes it. The failed list data structure 590 includes a data field 592 that holds data that indicates the interface label or labels that caused a failure. In some embodiments, the data field 592 includes a node ID field, an interface label field, and an interface ID field, as described above for untested list data structure 540. In these embodiments, the data is removed from the untested list and added to the failed list data structure 590. In some embodiments, the interface label is indicated by a pointer to a set of fields elsewhere in another data structure (e.g., data structure 510). In some embodiments in which the interface label is marked as tested rather than removed from the untested list data structure 540, the data field 592 includes pointers to an interface label in the untested list data structure 540 which is marked by a flag field 549 that holds data that indicates the interface label has been tested.

Although data structures and fields are depicted as integrated portions of memory of a process in a particular order within a NMS 120 on a single node for purposes of illustration, in other embodiments one or more data structures or fields are broken up into multiple portions in the same or different order on one or more different memories for one or more different processes on one or more different nodes, such as one or more different databases, or one or more portions are omitted.

In the illustrated embodiment, using the ordered LSP ID list of Table 5, an LSP ping is scheduled at PE 111b for label BD, an LSP ping is scheduled at PE 111c for label CD, and LSR self test is scheduled at PE 111a that tests interface label A. OAM messages are sent over the following interface labels D, C, B, E, J, I, H; then L, K, G, J, I, H; then A. This sequence of OAM messages has only three excess message in which J, I, H are tested a second time each. This reduces the number of excess messages to less than half of the 7 excess messages using the brute force approach, to determine that all LSPs in the MPLS network 100 are functioning properly. This savings is repeated several times a minute; so the network savings are substantial. The savings are even more significant the larger the MPLS network, as demonstrated in the next section.

If an interface label fails, then one or more subsequent LSP pings or LSR self tests that depend on the failed interface label are removed from the schedule or otherwise omitted. For example, if interface label J on outbound interface 113j on LSR 110e fails during the LSP ping over LSP BD, then LSP ping over LSP CD is removed from the schedule in a message sent from monitor process 150 on NMS 120 to an LSP Health Monitor scheduler process on PE node 111c.

4.0 Example Performance Savings

A simulated embodiment demonstrates the savings in a larger MPLS network. In the simulated embodiment, the network 102 included 308 nodes, including 256 PE nodes 111 and 63 LSR 110 in the core of the network 102. The Open Shortest Path First (OSPF) routing protocol was used to set up routing tables for IP routing and 9 OSPF areas were defined in the core network. The Border Gateway Protocol (BGP) was the external gateway protocol (EGP) between areas in the core. MP-BGP was used for MPLS-based paths that formed multiple virtual private networks (VPNs). A full mesh of 300,000 LSPs was established to connect each PE node to every other PE node. The average LSP had 8 equal-cost multipath (ECMP) labels, with a minimum of 4 and a maximum of 16 ECMP labels.

Figure 6:
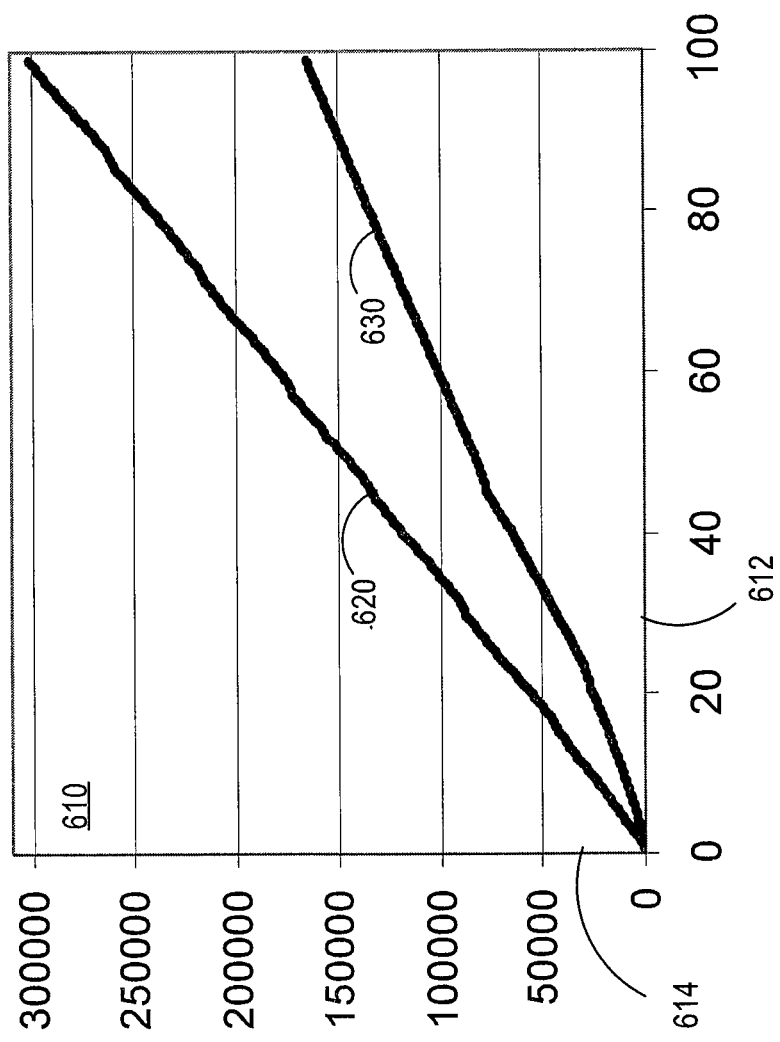
FIG. 6 illustrates some example performance benefits using one example embodiment.

FIG. 6 illustrates some example performance benefits obtained using the example simulated embodiment. FIG. 6 is a graph 610. The horizontal axis 612 indicates the percent of the network tested. The vertical axis 614 indicates the number of OAM packets sent over the network; thus the maximum value represents 300,000 OAM packets during each testing cycle (starting about 20 to 30 seconds apart). The trace 620 indicates the number of OAM packets sent to test the MPLS network using the brute force approach. Trace 620 indicates that over 300,000 data packets are sent to test the whole MPLS network. The trace 630 indicates the number of OAM packets sent to test the MPLS network using the illustrated embodiment, with all LSP pings scheduled before any are tested. Trace 630 indicates that only about 165,000 data packets are sent to test the whole MPLS network. The graph 610 applies when all interfaces pass the test, i.e., no failures. As can be seen, the savings is about 135,000 OAM packets ever 20 to 30 seconds, a savings of about 40%.

Figure 7:
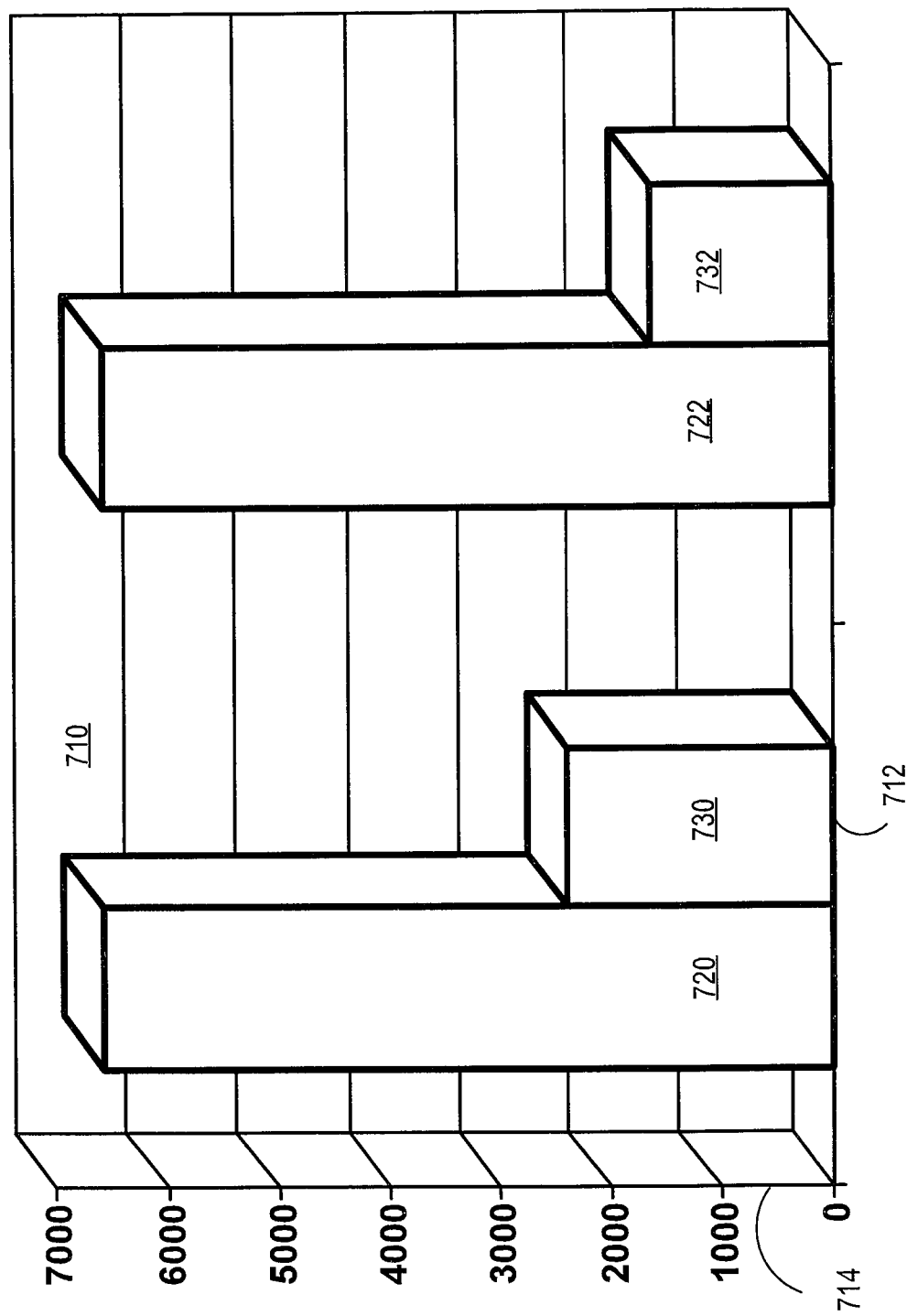
FIG. 7 illustrates different example performance benefits using the example embodiment.

FIG. 7 illustrates different example performance benefits using the example simulated embodiment. FIG. 7 is a bar chart 710. The vertical axis 714 indicates the number of LSP pings performed on a typical LSR, which has about 6500 LSPs running through it. The bar 720 indicates the number of LSP pings processed by a single LSR using the brute force approach when there are no failures in the MPLS network. The bar 730 indicates the number of LSP pings processed by a single LSR using the illustrated embodiment when there are no failures in the MPLS network. The savings is about 4000 LSP ping packets, e.g., about 60%.

The bar 722 indicates the number of LSP pings processed by a single LSR using the brute force approach when two of the six interfaces on the device have failed. The bar 732 indicates the number of LSP pings processed by a single LSR using the illustrated embodiment when the same two of six interfaces have failed. The savings is even greater at about 4800 LSP ping packets, e.g., about 73%. The extra savings is because sure to fail traffic is not sent into the network using the illustrated embodiment.

5.0 Implementation Mechanisms—Hardware Overview

Figure 8:
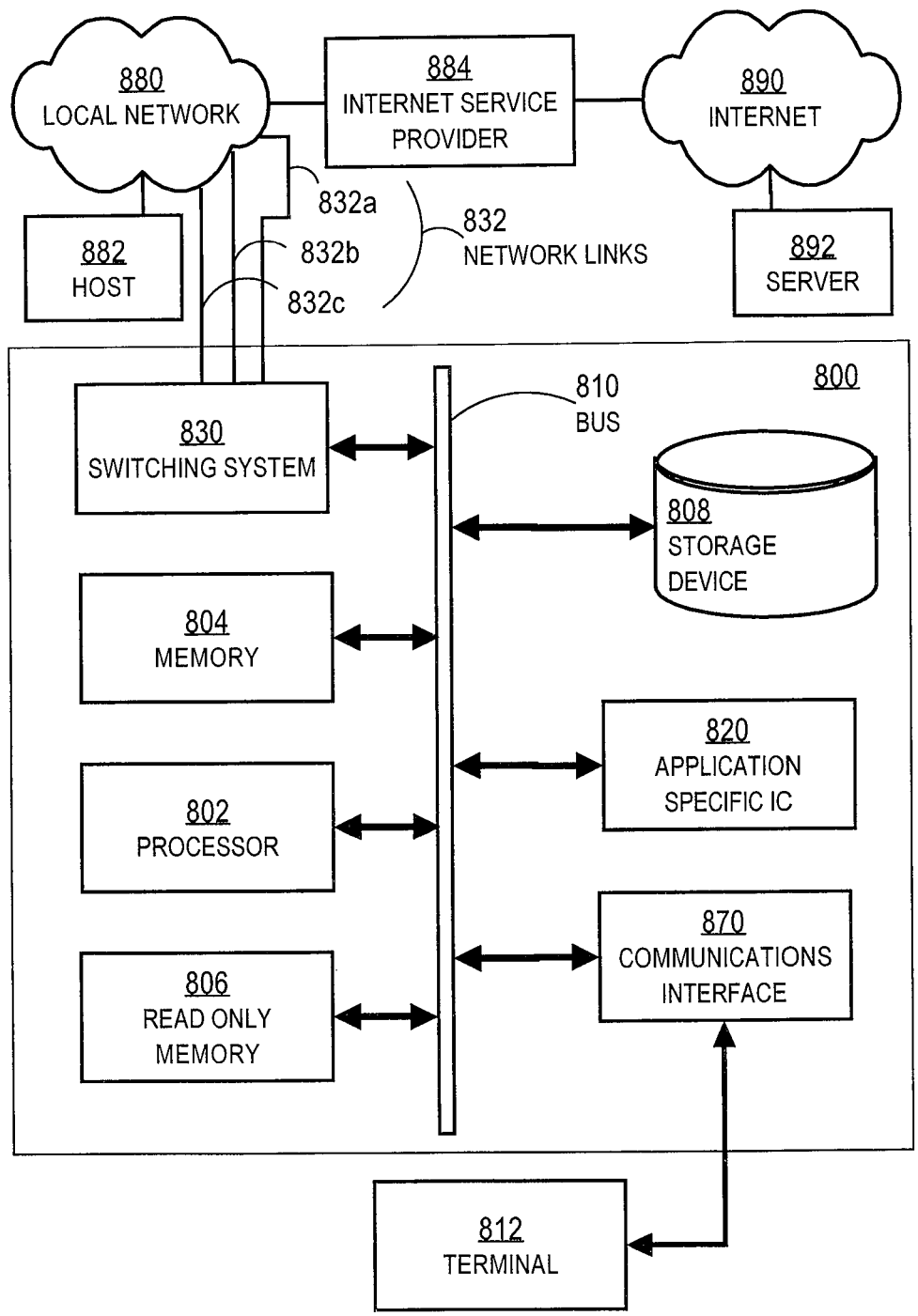
FIG. 8 illustrates a computer system upon which an embodiment of the invention may be implemented.

FIG. 8 illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitute computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk or optical disk, for storing information, including instructions, that persists even when the computer system 800 is turned off or otherwise loses power.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 810 for use by the processor from an external terminal 812, such as a terminal with a keyboard containing alphanumeric keys operated by a human user, or a sensor. A sensor detects conditions in its vicinity and transforms those detections into signals compatible with the signals used to represent information in computer system 800. Other external components of terminal 812 coupled to bus 810, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 812. In some embodiments, terminal 812 is omitted.

Computer system 800 also includes one or more instances of a communications interface 870 coupled to bus 810. Communication interface 870 provides a two-way communication coupling to a variety of external devices that operate with their own processors, such as printers, scanners, external disks, and terminal 812. Firmware or software running in the computer system 800 provides a terminal interface or character-based command interface so that external commands can be given to the computer system. For example, communication interface 870 may be a parallel port or a serial port such as an RS-232 or RS-422 interface, or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 800 includes switching system 830 as special purpose hardware for switching information for flow over a network. Switching system 830 typically includes multiple communications interfaces, such as communications interface 870, for coupling to multiple other devices. In general, each coupling is with a network link 832 that is connected to another device in or attached to a network, such as local network 880 in the illustrated embodiment, to which a variety of external devices with their own processors are connected. In some embodiments an input interface or an output interface or both are linked to each of one or more external network elements. Although three network links 832a, 832b, 832c are included in network links 832 in the illustrated embodiment, in other embodiments, more or fewer links are connected to switching system 830. Network links 832 typically provides information communication through one or more networks to other devices that use or process the information. For example, network link 832b may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides routing information for use with switching system 830.

The switching system 830 includes logic and circuitry configured to perform switching functions associated with passing information among elements of network 880, including passing information received along one network link, e.g. 832a, as output on the same or different network link, e.g., 832c. The switching system 830 switches information traffic arriving on an input interface to an output interface according to pre-determined protocols and conventions that are well known. In some embodiments, switching system 830 includes its own processor and memory to perform some of the switching functions in software. In some embodiments, switching system 830 relies on processor 802, memory 804, ROM 806, storage 808, or some combination, to perform one or more switching functions in software. For example, switching system 830, in cooperation with processor 804 implementing a particular protocol, can determine a destination of a packet of data arriving on input interface on link 832a and send it to the correct destination using output interface on link 832c. The destinations may include host 882, server 892, other terminal devices connected to local network 880 or Internet 890, or other routing and switching devices in local network 880 or Internet 890.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820 and circuits in switching system 830, may be used in place of or in combination with software to implement the invention. Thus, embodiments of the invention are not limited to any specific combination of hardware and software.

The signals transmitted over network link 832 and other networks through communications interfaces such as interface 870, which carry information to and from computer system 800, are example forms of carrier waves. Computer system 800 can send and receive information, including program code, through the networks 880, 890 among others, through network links 832 and communications interfaces such as interface 870. In an example using the Internet 890, a server 892 transmits program code for a particular application, requested by a message sent from computer 800, through Internet 890, ISP equipment 884, local network 880 and network link 832b through communications interface in switching system 830. The received code may be executed by processor 802 or switching system 830 as it is received, or may be stored in storage device 808 or other non-volatile storage for later execution, or both. In this manner, computer system 800 may obtain application program code in the form of a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to an infra-red signal, a carrier wave serving as the network link 832b. An infrared detector serving as communications interface in switching system 830 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802 or switching system 830.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A non-transitory computer-readable medium carrying one or more sequences of instructions, which, when executed by one or more processors, cause the one or more processors to perform:
receiving Multi-Protocol Label Switching (MPLS) label data that indicates all interface labels that belong to each path identifier (ID) of a plurality of path IDs associated with a corresponding plurality of paths between provider edge nodes in a MPLS network, wherein each interface label is associated with a network interface on an intermediate network node in the MPLS network;
wherein at least one interface label is for more than one of the path IDs;
based on the MPLS label data, generating an untested list that holds data that indicates all unique interface labels of the plurality of path IDs in the MPLS network;
based on the MPLS label data and the untested list, selecting a first particular path ID indicated in the MPLS label data, wherein a first set of one or more interface labels is for the first particular path ID;
scheduling a first set of one or more tests for a first set of one or more network interfaces of nodes in the MPLS network, wherein the first set of one or more network interfaces comprises network interfaces having an interface label that is included in the untested list and that is in the first set of one or more interface labels;
removing, from the untested list, data that indicates the first set of one or more interface labels;
based on the MPLS label data and the untested list, selecting a second particular path ID indicated in the MPLS label data, wherein a second set of one or more interface labels is for the second particular path ID and wherein at least one interface label in the second set of one or more interface labels also is in the first set of one or more interface labels;
wherein the second particular path ID is different than the first particular path ID;
after said removing from the untested list data that indicates the first set of one or more interface labels, scheduling a second set of one or more tests for a second set of one or more network interfaces of nodes in the MPLS network, wherein the second set of one or more network interfaces comprises network interfaces having an interface label that is included in the untested list and that is in the second set of one or more interface labels;
removing, from the untested list, data that indicates the second set of one or more interface labels;
determining that the untested list no longer includes data for at least one interface label;
in response to said determining that the untested list no longer includes data for at least one interface label, reporting performance of the MPLS network based on results from the scheduled first and second set of one or more tests.

2. The non-transitory computer-readable medium as in claim 1 further comprising instructions which, when executed by the one or more processors, cause the one or more processors to perform:
for each path ID of the plurality of path IDs, if it is determined that the untested list includes data for at least one interface label, then, based on the MPLS label data and the untested list, selecting a next path ID indicated in the MPLS label data;
scheduling a set of one or more tests for one or more network interfaces of nodes in the MPLS network and comprising network interfaces that have an interface label that is included in the untested list and that is for the next path ID;
removing, from the untested list, data that indicates the interface labels for the next path ID.

3. The non-transitory computer-readable medium as recited in claim 2, wherein:
instructions for selecting a next path ID indicated in the MPLS label data comprise instructions for selecting a path ID for which a number of interface labels indicated by the data in the untested list for the path ID is not exceeded by any other remaining path ID in the MPLS label data;
the non-transitory computer-readable medium further comprises instructions which, when executed by the one or more processors, cause the one or more processors to perform removing the next path ID from further consideration before returning to said selecting the next path ID.

4. The non-transitory computer-readable medium as recited in claim 2, wherein:
the non-transitory computer-readable medium further comprises instructions which, when executed by the one or more processors, cause the one or more processors to perform generating an ordered path ID list that holds data that indicates the plurality of path IDs;
instructions for selecting the next path ID further comprise instructions for selecting a next path ID in the ordered path ID list that has the most remaining interface labels on the untested list.

5. The non-transitory computer-readable medium as recited in claim 2, further comprising instructions for performing:
determining whether a number of interface labels indicated by the data in the untested list for the next path ID is above a threshold;
if it is determined that the number is above the threshold, then scheduling a label switched path (LSP) ping over a particular path that corresponds to the next path ID.

6. The non-transitory computer-readable medium as recited in claim 5, further comprising instructions for, if it is determined that the number is not above the threshold, then scheduling a label switching router (LSR) self test on each network interface with interface labels indicated by the data in the untested list that belong to the next path ID.

7. The non-transitory computer-readable medium as recited in claim 5, wherein the threshold is one interface label.

8. The non-transitory computer-readable medium as recited in claim 2, further comprising instructions which, when executed by the one or more processors, cause the one or more processors to perform:
determining whether a particular network interface failed said testing;
if it is determined that a particular network interface failed said testing, adding data that indicates an interface label for the particular network interface to a failed interface list.

9. The non-transitory computer-readable medium as recited in claim 8, further comprising instructions for not scheduling the one or more tests for a network interface with an interface label indicated by data included in the failed interface list.

10. The non-transitory computer-readable medium as recited in claim 2, instructions for performing selecting the next path ID comprise instructions for performing:
determining whether a particular plurality of path IDs have a particular maximum number of interface labels indicated in the untested list;
if it is determined that the particular plurality of path IDs has the particular maximum number, then selecting from the particular plurality of path IDs the next path ID that has no more interface labels that are missing from the untested list than any other path ID in the particular plurality of path IDs.

11. A method comprising:
receiving a request to perform a test for a first set of one or more network interfaces of nodes in an MPLS network;
wherein the first set of one or more network interfaces comprises network interfaces of nodes that are included in a particular path of a plurality of paths between provider edge nodes in the MPLS network,
determining how many network interfaces of the first set of one or more network interfaces have not been previously tested during one or more tests of other paths, of the plurality of paths, that are different than the particular path;
based on how many network interfaces of the first set of one or more network interfaces have not been previously tested, selecting a particular type of test to perform for the first set of one or more network interfaces in the particular path;
performing the test for the first set of one or more network interfaces in the particular path;
wherein the method is performed by one or more computing devices.

12. The method as recited in claim 11:
wherein at least one network interface in the particular path is also included in a second path of the plurality of paths between provider edge nodes in the MPLS network;
wherein the second path is a different path than the particular path;
wherein said determining how many network interfaces of the first set of one or more network interfaces have not been previously tested further comprises determining that at least one network interface has been previously tested, within a testing threshold, in connection with a test performed on a second set of one or more network interfaces of nodes that are includes in the second path.

13. The method as recited in claim 11, wherein said performing a test for the first set of one or more network interfaces in the particular path comprises performing tests only for network interfaces in the first set of one or more network interfaces that have not been previously tested.

14. The method as recited in claim 11, wherein the particular type of test that is performed is a first type of test if a number of network interfaces that have not yet been previously tested exceeds a threshold.

15. The method as recited in claim 14, wherein the first type of test is a label switched path (LSP) ping over the particular path between provider edge nodes in the MPLS network and wherein performing a test for the first set of one or more network interfaces in the particular path comprises performing the LSP ping over the particular path.

16. The method as recited in claim 14, wherein the particular type of test that is performed is a second type of test if the number of network interfaces that have not yet been previously tested is below the threshold.

17. The method as recited in claim 16, wherein the second type of test is a label switching router (LSR) self test and wherein performing a test for the first set of one or more network interfaces in the particular path comprises performing the LSR self test on each network interface, of the first set of one or more network interfaces, that has not been previously tested.

18. The method as recited in claim 11, further comprising:
determining whether at least one network interface of the first set of one or more interfaces failed during the one or more tests of other paths;
if it is determined that the at least one network interface failed the test during the one or more tests of other paths, not performing a test for the at least one network interface.

19. A non-transitory computer-readable medium carrying one or more sequences of instructions, which, when executed by one or more processors, cause the one or more processors to perform:
receiving a request to perform a test for a first set of one or more network interfaces of nodes in an MPLS network;
wherein the first set of one or more network interfaces comprises network interfaces of nodes that are included in a particular path of a plurality of paths between provider edge nodes in the MPLS network,
determining how many network interfaces of the first set of one or more network interfaces have not been previously tested during one or more tests of other paths, of the plurality of paths, that are different than the particular path;
based on how many network interfaces of the first set of one or more network interfaces have not been previously tested, selecting a type of test to perform for the first set of one or more network interfaces in the particular path;
performing the test for the first set of one or more network interfaces in the particular path.

20. The non-transitory computer-readable medium as recited in claim 19:
wherein at least one network interface in the particular path is also included in a second path of the plurality of paths between provider edge nodes in the MPLS network;
wherein the second path is a different path than the particular path;
wherein instructions for determining how many network interfaces of the first set of one or more network interfaces have not been previously tested further comprise instructions for determining that at least one network interface has been previously tested, within a testing threshold, in connection with a test performed on a second set of one or more network interfaces of nodes that are includes in the second path.

21. The non-transitory computer-readable medium as recited in claim 19, wherein instructions for performing a test for the first set of one or more network interfaces in the particular path comprise instructions for performing tests only for network interfaces in the first set of one or more network interfaces that have not been previously tested.

22. The non-transitory computer-readable medium as recited in claim 19, wherein the particular type of test that is performed is a first type of test if a number of network interfaces that have not yet been previously tested exceeds a threshold.

23. The non-transitory computer-readable medium as recited in claim 22, wherein the first type of test is a label switched path (LSP) ping over the particular path between provider edge nodes in the MPLS network and wherein instructions for performing a test for the first set of one or more network interfaces in the particular path comprise instructions for performing the LSP ping over the particular path.

24. The non-transitory computer-readable medium as recited in claim 23, wherein the particular type of test that is performed is a second type of test if the number of network interfaces that have not yet been previously tested is below the threshold.

25. The non-transitory computer-readable medium as recited in claim 24, wherein the second type of test is a label switching router (LSR) self test and wherein instructions for performing a test for the first set of one or more network interfaces in the particular path comprise instructions for performing the LSR self test on each network interface, of the first set of one or more network interfaces, that has not been previously tested.

26. The non-transitory computer-readable medium as recited in claim 19, further comprising instructions for:
- determining whether at least one network interface of the first set of one or more interfaces failed during the one or more tests of other paths;
- if it is determined that the at least one network interface failed the test during the one or more tests of other paths, not performing a test for the at least one network interface.

* * * * *